June 1, 1965 E. B. POOL 3,186,680

VALVES

Filed Nov. 7, 1962 4 Sheets-Sheet 3

INVENTOR
Eldert B. Pool

BY *Strauch, Nolan & Neale*
ATTORNEYS

June 1, 1965   E. B. POOL   3,186,680
VALVES
Filed Nov. 7, 1962   4 Sheets-Sheet 4
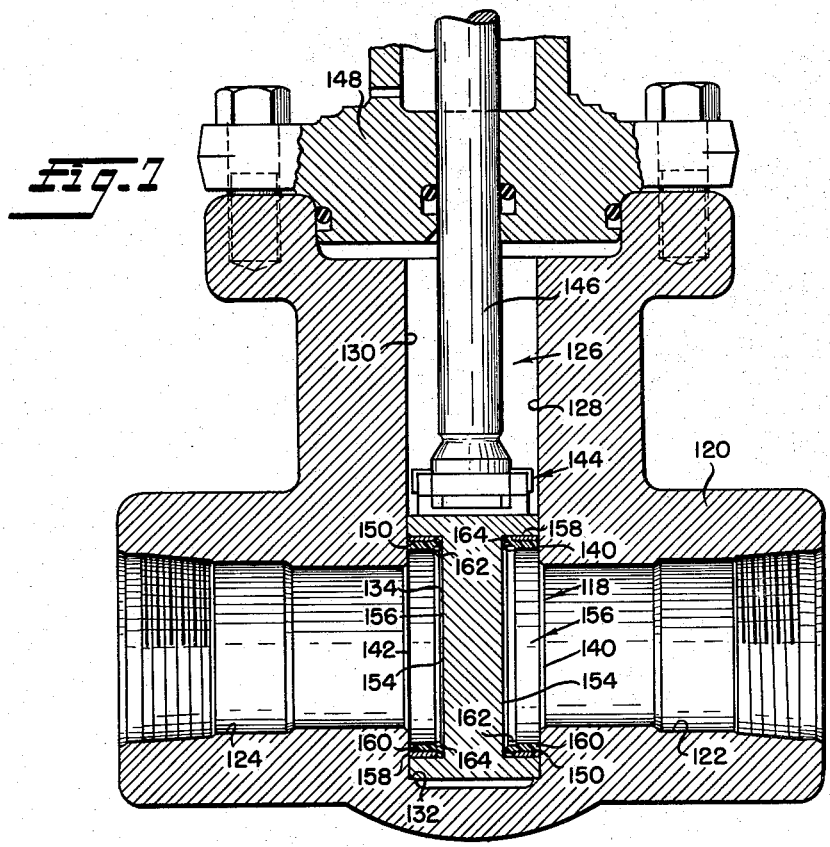
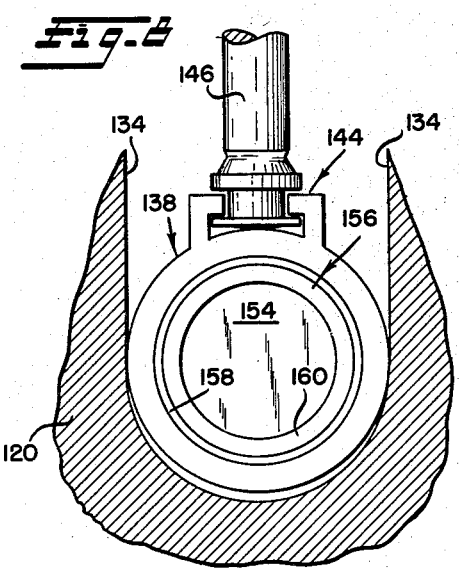
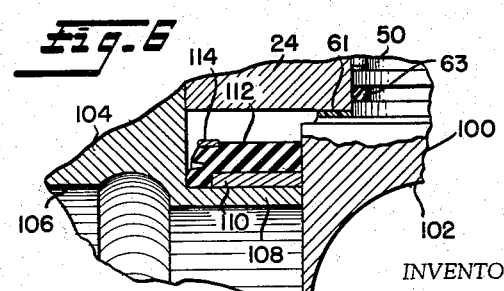
INVENTOR
Eldert B. Pool
BY
ATTORNEYS

United States Patent Office 3,186,680
Patented June 1, 1965

3,186,680
VALVES
Eldert B. Pool, Palos Park, Ill., assignor, by mesne assignments, to Rockwell Manufacturing Company, Pittsburgh, Pa., a corporation of Pennsylvania
Filed Nov. 7, 1962, Ser. No. 236,017
8 Claims. (Cl. 251—175)

This invention relates to valves and more particularly to plug valves and gate valves including improved composite sealing constructions including rigid components and resilient components bonded together.

As used herein, the term plug valves is intended to embrace valves of all forms having a rotatable closure member and the term gate valves is intended to include all valves having a reciprocating valve closure member.

It is the principal purpose and object of the present invention to provide improved sealing structures of the type disclosed and claimed in U.S. Patent 2,970,805 granted February 7, 1961.

The improved sealing structure of the present invention retains all of the advantages of the prior structure and provides a substantial improvement in service life and a reduction in operating torque.

To increase the versatility of such valves and to simplify installation procedures, they are constructed so that either side of the valve may be connected to the upstream line pressure. Thus in such valves only one of the composite sealing ring structures is ordinarily required to sustain and seal against the full line pressure in a given installation. The other ring is relatively inactive. However, it has now been discovered that the relatively inactive sealing ring is subject to damage by the application across it of a pressure differential in the direction opposite to that which the sealing structure was intended primarily to resist. Such damage takes the form of destruction of the bond between the rubber and metal components of the ring, and the tearing away of the rubber from the supporting metal.

A related problem is encountered because of the necessity to provide an initial contact pressure between the rubber or other resilient components of the seal ring and the adjacent valve structure in the absence of fluid pressure differential applied across the sealing structure. This contact pressure must be sufficiently high to assure the formation of the subsequent seal and yet should be as low as possible to prevent the creation of high operating torque. It was discovered that when provision was made for increasing the resistance of the prior sealing structure to deterioration or destruction, the effective contact pressure between the resilient portion of the sealing elements and the adjacent valve structure was significantly increased which materially increased the valve operating torque.

In accordance with another aspect of the invention, this problem was solved by the provision of an improved composite sealing ring structure having substantially improved resistance to the deterioration caused by applied pressure differentials, while at the same time providing for reduced operating torque.

The sealing structure of the present invention comprises a ring of rubber or like resilient material, to the inner and outer peripheries of which metal reinforcement rings are bonded. The metal rings are disposed in a unique manner to effect complete protection of the rubber portion of the sealing structure under all operating conditions. The protection to the rubber is maintained whether the sealing structure is installed on the upstream side or the downstream side of the valve closure member.

The rubber portion of the sealing structure is also of unique form, such that it establishes and maintains a seal between the valve body and the valve closure member at all pressures from zero up to the rated capacity of the valve body and yet does not create high operating torque.

Other objects and advantages of the present invention will become apparent as the description proceeds in connection with the accompanying drawings in which.

Figures 3, 4:
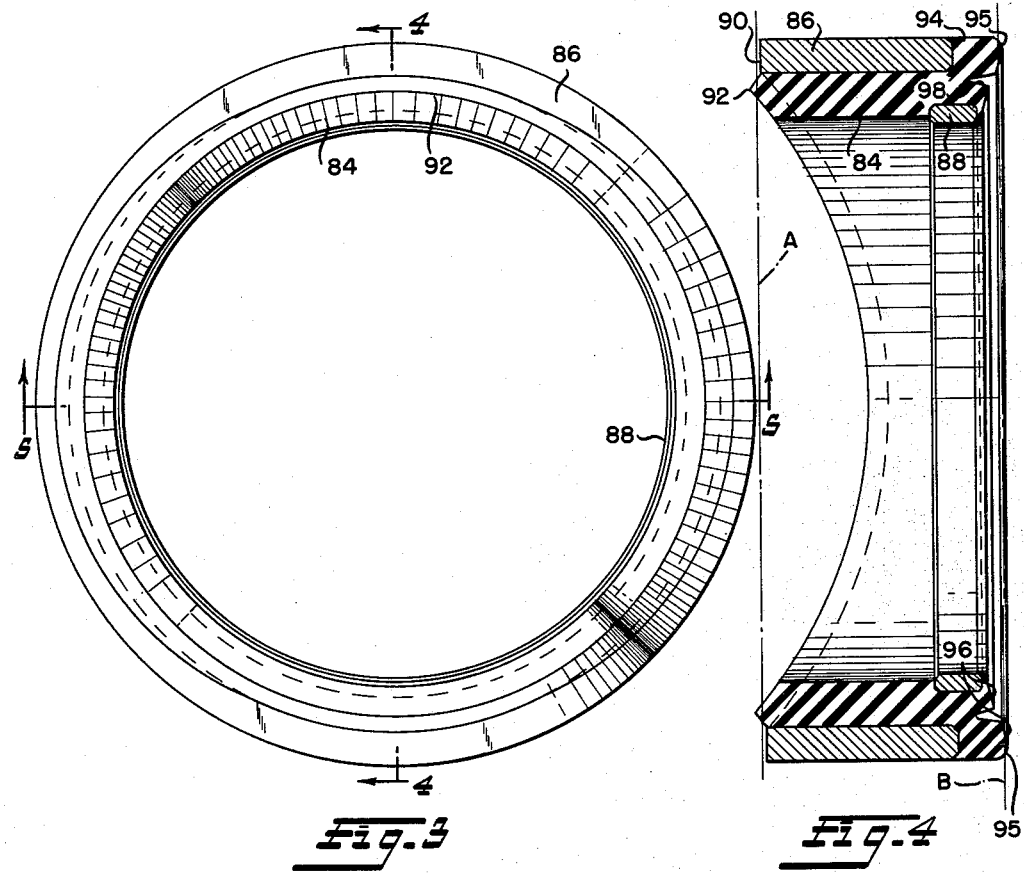
FIGURE 3 is a front elevation of the sealing structure of the present invention removed from the remaining components of the valve.
Figure 5:
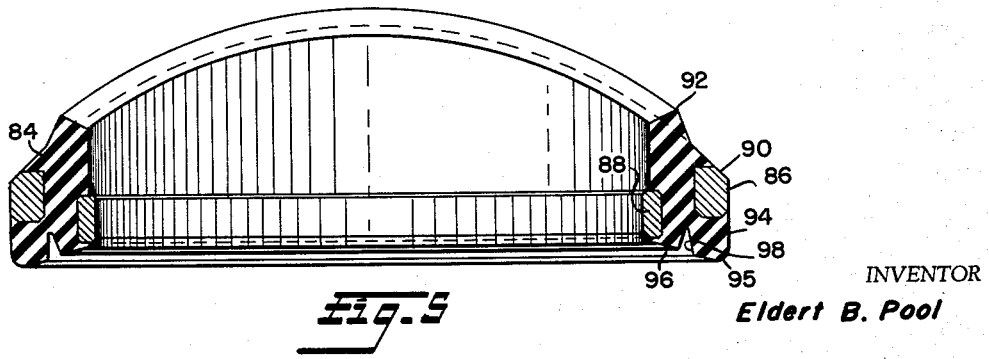

FIGURES 4 and 5 are sections through the seal ring structure of FIGURE 3 taken respectively along lines 4—4 and 5—5 of FIGURE 3;

FIGURE 6 is a fragmentary vertical section showing a modified installation of the sealing structure of the present invention in a plug valve;

FIGURE 7 is a fragmentary vertical central section illustrating the sealing structure of the present invention incorporated in a gate valve; and FIGURE 8 is a fragmentary section taken along lines 8—8 of FIGURE 7.

Figure 1:
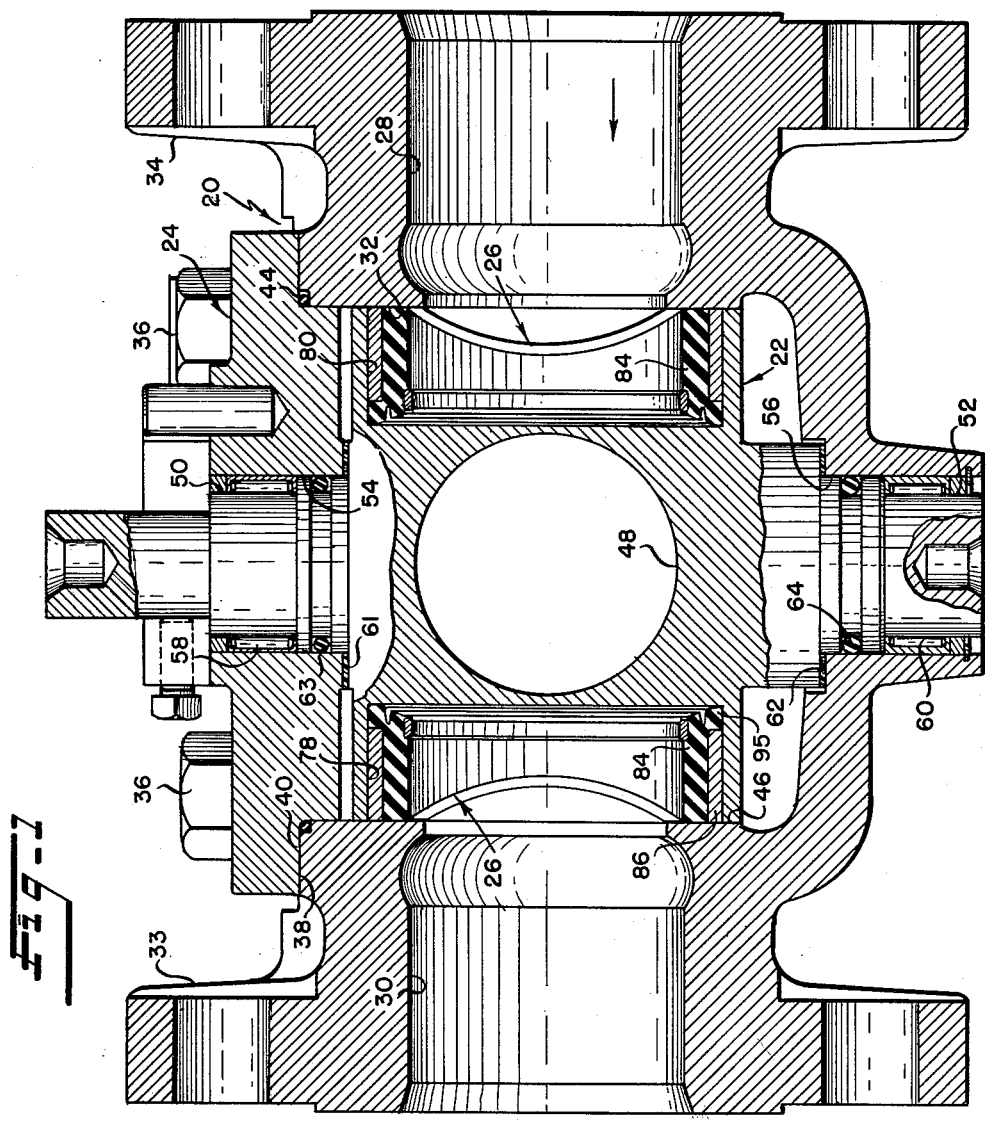
FIGURE 1 is a central vertical section through a plug valve incorporating the sealing structure of the present invention.
Figure 2:
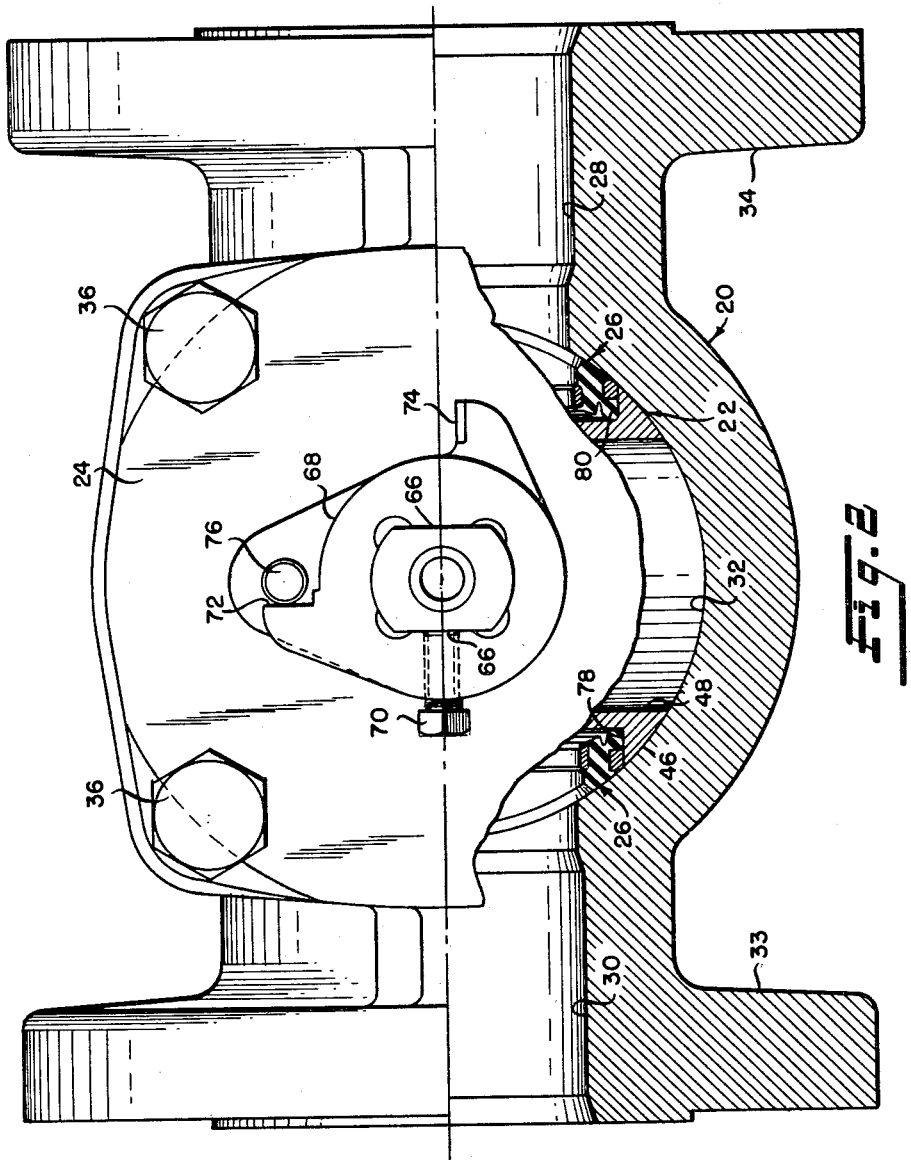
FIGURE 2 is a top plan view of the valve of FIGURE 1 partly in section.

Referring more specifically to the drawings, the principal components of the valves shown in FIGURES 1 and 2 are the body 20, the valve plug 22, the top cover member 24, and the identical composite sealing ring structures indicated generally at 26.

The valve body which is of one-piece construction is provided with flow passages 28 and 30, which at their inner ends intersect a cylindrical valve chamber 32. In the form shown, the valve is so-called flanged end construction and incorporates flanges 33 and 34 for attachment to the associated pipe lines. The valve cover 24 is detachably secured to the valve body by four studs 36 (two shown) which hold a radial surface 38 on the cover in contact with the corresponding surface 40 on the valve body. The joint between the valve cover member and the valve body is sealed by an O-ring 44. The valve plug member 22 is provided with a body portion 46 having a through-port 48 and upper and lower aligned stem portions 50 and 52 received in aligned openings 54 and 56 and the valve cover and valve body, respectively. To reduce operating torque, the stem portions 50 and 52 are supported on respective needle bearing assemblies 58 and 60. Also, upper and lower nylon thrust washers 61 and 62 are provided to reduce operating torque if end loads are developed in operation. Upper and lower O-rings 63 and 64 seal the stem portions 50 and 52.

The upper end of the upper stem 50 is provided with flats 66 for the reception of a valve operating wrench by which the valve closure member may be moved 90° from the closed position shown to the open position in which the port 48 is aligned with the passages 28 and 30. A stop-member 68 is secured by a screw 70 to the projecting portion of the stem 50 and is provided with abutment surfaces 72 and 74 which engage a stop pin 76 carried by the valve cover to determine the full open and full closed position of the valve.

The sealing ring structures 26 which are received in aligned cylindrical recesses 78 or 80 in the plug will now be described in detail with particular reference to FIGURES 3, 4 and 5. The resilient body portion 84 of the composite seal ring structure is preferably molded from Buna-N type rubber with a Durometer hardness of approximately 70. Buna-N is preferred for many installations since it is resistant to oil and has the other desirable physical and chemical characteristics. Other types of rubber may be used where dictated by special service departments.

Bonded to portions of the inner and outer periphery of the resilient body 84 are metal reinforcing rings 88 and 86, respectively. The axial length of the outer reinforcing ring 86 is considerably less than the length of the rubber body portion 84 so that the rubber portion extends beyond each end of the reinforcing ring. The axially inner end of the reinforcing ring 86 is essentially flat while the axially outer end surface 90 is formed as a portion of a cylinder so it closely conforms to the cylindrical wall of the valve chamber 32. The outer end surface of the rubber body portion 84 is tapered to form a ridge 92 which also forms a portion of a cylinder to follow the contour of the cylindrical valve chamber wall.

The outer surface 94 of the portion of the rubber body at the inner end of the ring 86 is cylindrical and is substantially flush with the outer surface of the ring 86 so as to be freely received within the recess 80.

Around its circumference, the axial length of the resilient body 84 is greater than the distance between the bottom wall of the recesses 78 or 80 and the cylindrical wall of the valve chamber 32. Accordingly, the rubber is lightly compressed between the inner wall of the valve chamber and the bottom wall of the recesses 78 or 80. The extent of this compression is approximately shown by the phantom lines A and B representing the valve chamber wall and the bottom of the recesses 78 or 80 respectively.

The rubber body reaches its maximum depth in the region 95 adjacent its outer periphery and is of uniformly decreasing depth toward its inner periphery along the inclined surface 96. The surface 96 is interrupted by an annular groove 98 to impart additional flexibility to the bottom portion of the rubber body.

When the composite sealing structures 26 are installed in the valve in the absence of fluid pressure, each of the rings is slightly compressed in an axial direction, the compression being sufficient to establish two low pressure seals. An outer seal is formed between the ridge portion 92 of the resilient body and the wall of the valve chamber and an inner seal is formed in the area of the bottom ridge and the bottom of the recess 78 or 80 in which the sealing structure is received. It is to be noted that the seal at the ridge 92 is disposed radially inwardly of the seal at the region 95. Accordingly, when differential pressures are applied across the sealing structure at the inlet side or upstream side of the valve, a force equal to the product of the differential pressure and the annular area between the sealing diameters urges the sealing ring structure outwardly of the recess in which it is received into tight sealing engagement with the wall of the valve chamber 32.

For example, if it is assumed that the valve passage 28 is connected to a source of fluid under pressure, that the valve is closed as shown in FIGURE 1, and the passage 30 is connected to a low pressure area, the sealing ring structure received in the recess 80 will be forced outwardly of the recess into firm engagement with the wall of the valve body chamber. The outward movement of the sealing structure is limited by contact of the outer surface 90 of the back-up ring 86 with the wall of the valve body chamber. The ridge portion 92 of the rubber readily distorts under pressure differential permitting the back-up ring 86 to come into surface contact with the body. This action prevents extrusion of the rubber past the back-up ring into the center cavity and thus eliminates a chief cause of damage and deterioration of the rubber portion of the seal ring. Since the reinforcing ring 86 is received with a close fit against the outer wall of the recess 80, extrusion of the rubber from the region 95 is also prevented. An increase in the pressure differential merely seats the back-up ring 86 more tightly against the valve body. Thus regardless of the pressure level, there is no opportunity for the rubber to be damaged and the seal is thus capable of holding any pressure for which the valve body is designed.

It is to be noted that the inner back-up ring 88 and the groove 98 are not involved in the sealing action of the upstream sealing ring. However, these elements of the seal structure perform an important function in protecting the downstream seal ring, and the action of which will now be considered.

Theoretically, if the valve is fully closed, as shown in FIGURE 1, before high pressure fluid is supplied to the inlet port 28, the downstream sealing ring structure received in the recess 78 will not be exposed to the action of the line fluid. However, in practice, there are many circumstances which expose the downstream ring to flow and pressure differentials, for example when the fluid is flowing through the valve and the valve is then moved to closed position. Under these circumstances, the pressure at the outer periphery of the sealing ring is always greater than the pressure at the inner periphery.

The pressure differential across the downstream ring acts to urge the entire sealing assembly into the recess in which it is received and further acts to urge the rubber portion of the sealing ridge radially inwardly away from the metal back-up ring 86. Both of these actions tend to decrease the pressure with which the ridge 92 engages the adjacent body wall structure. However, if the sealing structure is relatively inflexible, the ridge 92 deflects inwardly to relieve the pressure trapped in the valve body upstream of the sealing structure only after a relatively high pressure differential is established across the seal.

In the absence of the increased flexibility of the rubber structure imparted by the groove 98, fluid trapped between the downstream sealing ring and the upstream sealing ring may escape along a tortuous path defined by the space between the outer periphery of the back-up ring 86 and the wall of the recess in which it is received and then around the back of the insert into the downstream port 30. Under these conditions trapped fluid, in escaping toward the low pressure port, would force the bottom portion of the insert away from the wall of the recess in which it is received to provide a passage for the flow of fluid.

Experience has shown that the pressure exerted in deflecting the bottom of the insert away from the adjacent valve closure wall under these conditions may exceed the inherent physical strength of the rubber adjacent to the metal-rubber interface and may cause the rubber to shear and tear away from the back-up ring 86.

This difficulty encountered in prior constructions is completely eliminated by the groove 98 which increases the flexibility of the sealing ring and reduces the pressure at which the seal at the ridge 92 is broken and by the incorporation of the inner metal support ring 88 bonded to the inner periphery of the rubber sealing ring 84 in the region of the sealing ring which is most susceptible to damage under these conditions.

The operating torque on the valve is maintained well within acceptable limits with the present structure. In a typical case, the sealing ring at the downstream side of the valve will permit the leakage of trapped fluid when the differential pressure across the sealing ring is in the region of 50–75 p.s.i. Thus, the frictional contact between the rubber portions of the sealing structure and the valve body structure is maintained within reasonably low limits which assures relatively low operating torque and favorable wear characteristics.

FIGURE 6, to which detailed reference will now be made, illustrates another application of the seal of the present invention in a plug valve. In this form of the invention the sealing structure is carried by the valve body rather than the valve closure member and the principal seal is made at the downstream side of the valve closure member.

The valve body, the valve closure member, and the mounting and operating apparatus for the valve closure member are essentially the same as the corresponding components of FIGURES 1 and 2 except as noted below. In this form of the invention the valve plug has a cylindrical body 100 and a cylindrical through port 102. The valve body 104 is essentially the same as the valve body of FIGURE 1 except that at their inner peripheries, the inner ends of the ports 106 (one shown) are extended to provide a relatively rigid ring 108 surrounding the ports and extending into close clearance relation with the cylindrical wall of the plug 100. The inner edge of the ring 108 is suitably contoured for this purpose.

The composite sealing ring is of essentially the same construction as the sealing rings described above. It is, however, in effect turned inside out to dispose the heavy metal reinforcing ring 110 along the inner periphery of the resilient body 112 and to dispose the secondary metal ring 114 at the outer periphery of the resilient body 112. The inner periphery of the ring 110 is telescoped with a close sliding fit over the outer periphery of the body ring 108 and its outer edge is suitably contoured to make circumferential contact with the cylindrical wall of the valve plug 100. The configuration of the resilient body 112 in any given section is the same as the configuration of the sealing structures described above and, as in the previously described embodiment, the axial length of the resilient body 112, when it is relaxed is slightly greater than the corresponding dimension of the space in which it is received.

In operation, if fluid under pressure is supplied through the body port (not shown) and the port 106 is connected to a low pressure region, the seal structure shown will form the primary seal and will be urged against the body of the valve plug in the same manner as the previously described seal was urged against the adjacent wall of the valve body thus forming a downstream seal. The identical ring at the upstream side of the valve will form an initial relatively low pressure seal which will be broken when the pressure differential rises to 50–75 p.s.i., permitting substantially the full line pressure to be applied against the downstream seal shown.

As in the previously described embodiment, full protection is afforded the seal during opening and closing movements of the valve and during pressure fluctuations.

Detailed reference will now be made to FIGURE 7 and FIGURE 8 which show the application of the invention to a gate valve. The valve body indicated generally at 120 has aligned through passages 122 and 124 which open at their inner ends into a central cavity 126. The valve is symmetrical and either of the passages 122 or 124 may be connected to pressure.

The central cavity 126 is defined on two sides by flat walls 128 and 130 which are normal to the axis of the passages 122 and 124 and extend upwardly to the top of the valve body. The bottom of the cavity 126 is defined by an arcuate wall 132 which merges into flat vertical walls 134.

A valve gate 138 is provided with flat opposite sides 140 and 142 which are received for free-sliding movement along the walls 128 and 130. The gate is preferably circular in form and has a diameter which is substantially greater than the diameter of the passages 122 and 124 and substantially the same as the diameter of the bottom cavity wall 132. The gate is attached by means of a clip construction 144 to the lower end of a stem 146. The construction of the clip is such that the gate is free to shift slightly in a direction parallel to the axis of the passages 122 and 124. The upper portion of the valve body is closed and sealed by a cover 148 of conventional construction which also supports the upper portion of the stem 146 and carries a stem operating mechanism (not shown) which may take a number of conventional forms. The opposite side faces 140 and 142 of the gate are provided with identical annular recesses having outer cylindrical walls 150 and flat bottom walls 154.

Identical composite sealing ring structures indicated generally at 156 are received in the valve gate recesses. The sealing assemblies are the same as those described above, except that they are not contoured for reception in a cylindrical valve cavity. Each of the sealing structures comprises an outer metal reinforcing ring 158, closely fitting against the walls 150 of the valve gate recesses, and a rubber seal element 160 bonded to the inner periphery of the back-up ring 158. Thus, the sealing ring completely surrounds the flow passages when the valve gate is in closed position as shown in FIGURE 7. The sealing assemblies also include the inner metal support ring 162 and the groove 164 formed in the bottom portion of the sealing assembly.

As in the case of the sealing ring structures of FIGURES 1–6, the axial dimension of the rubber seal elements 160 is such that when the valve gate is closed as shown in FIGURE 7, they are lightly compressed between the respective surfaces 128 and 154 and 130 and 154 in the absence of fluid pressure. The sealing action of these members is identical to that of the corresponding members described above. Also, as before, either end of the valve may be connected to a source of fluid under pressure, the opposite end of the valve being connected to a lower pressure area. When the fluid pressure is applied, the sealing ring structure at the upstream side of the gate 138 is urged out of the recess in which it is received into firm sealing contact with the adjacent valve body structure. The sealing structure at the downstream side of the gate permits the escape of any entrapped fluid. As in the embodiment of FIGURES 1–6, both of the sealing structures are fully protected in all portions of the valve gate and under all conditions of constant and varying pressure differential.

It will also be understood that the valve of FIGURES 7 and 8 may be readily adapted to provide a downstream seal by positioning a modified insert of the type shown in FIGURE 6 in a recess in the valve body wall. In this case the recesses provided in the opposite faces of the gate will be eliminated. The valve so modified will provide a primary seal at the downstream side of the valve in the manner described in connection with the embodiment of FIGURE 6.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A valve comprising a body having inlet and outlet ports communicating with a chamber, a valve closure member mounted for movement in said chamber between open and closed positions, said valve closure member having a recess bounded by a continuous annular wall surrounding said inlet port when said valve closure member is in closed position; a composite sealing ring received in said recess, said sealing ring comprising a resilient body compressed between the bottom of said recess and the surface of said valve body surrounding said port when said valve is closed; an outer rigid reinforcing ring bonded to the outer periphery of said resilient body and slidably engaging said annular wall; an inner rigid reinforcing ring bonded to the inner periphery of said resilient body in the region adjacent the bottom of said insert, the portion of said resilient body adjacent the bottom of said recess being grooved in order to increase its flexibility.

2. A plug valve comprising a body having inlet and outlet ports communicating with a chamber; a plug mounted for rotation in said chamber between an open position in which a through passage in said plug connects said inlet port to said outlet port and a closed position in which said passage is out of alignment with said ports, said plug having recesses bounded by continuous annular walls surrounding said ports when said plug is in said closed position; an annular composite sealing structure received in each of said recesses, each sealing structure comprising a resilient sealing ring compressed between the bottom of a recess and the surface of said valve body surrounding said port when said valve is closed, the portion of said resilient sealing ring adjacent the bottom of said recess being grooved to increase the flexibility of said sealing ring, an outer metal reinforcing ring bonded to the outer periphery of said resilient sealing ring, the outer periphery of said outer ring slidably engaging said annular wall; an inner rigid reinforcing ring bonded to the inner periphery of said resilient sealing ring in the region adjacent the bottom of said recess, said resilient sealing ring having a sealing portion engaging the wall of said chamber radially inward of said outer reinforcing ring and having a second sealing portion engaging the bottom of said recess, the area encompassed by the seal at the bottom of said recess being greater than the area encompassed by the seal against the valve chamber wall, whereby the entire composite ring structure is urged outwardly against the wall of said body by the application of line pressure through the adjacent port.

3. A valve comprising a body having inlet and outlet ports communicating with a chamber; a valve closure member mounted for movement in said chamber between said open and closed positions, said valve closure member having recesses each bounded by a continuous annular wall surrounding said ports when said valve closure member is in closed position; a composite sealing ring received in each of said recesses, each sealing ring comprising a rigid outer reinforcing ring, the outer periphery of which slidably engages said annular wall; a resilient sealing ring bonded to the inner periphery of said reinforcing ring and compressed between the bottom of said recess and the surface of said valve body surrounding said port when said valve is closed; an inner rigid reinforcing ring bonded to the inner periphery of said sealing ring in the region adjacent the bottom of said recess, and said sealing ring having a groove in the region thereof adjacent the bottom of said recess to increase the flexibility of said sealing ring.

4. A gate valve comprising a body having inlet and outlet ports communicating with a chamber having substantially flat annular areas surrounding said ports; a gate mounted for movement in said chamber between an open position in which said gate is out of alignment with said ports and a closed position in which said gate is interposed between said ports, said gate having recesses on its opposite faces, each recess being bounded by a continuous annular wall surrounding a port when said gate is in closed position, a composite sealing ring received in each of said recesses, each sealing ring comprising an outer rigid reinforcing ring, the outer periphery of which slidably engages one of said annular walls, a resilient sealing ring bonded to the inner periphery of said reinforcing ring and compressed between the bottom of said recess and said flat surface of said body surrounding said port when said gate is in closed position, the portion of said sealing ring in sealing engagement with the bottom of said recess being disposed radially outward of the portion of the resilient sealing ring in sealing engagement with the valve body whereby the entire composite ring structure is urged outwardly against the wall of said body by the application of line pressure from the adjacent port; an inner rigid reinforcing ring bonded to the inner periphery of said resilient sealing ring in the region adjacent the bottom of said recess, and said sealing ring being grooved in the region adjacent the bottom of said recess to increase its flexibility.

5. In a valve structure, a valve body member having a fluid port therein; a closure member movably disposed in said body member for opening and closing said port, said members having confronting surfaces which are moved relatively when said closure member is moved, one of said surfaces having a recess therein surrounding said port when said closure member is in closed position, said recess having a cylindrical wall, a composite sealing ring received in said recess, said sealing ring comprising a rigid outer reinforcing ring, the outer cylindrical periphery of which slidably engages the outer wall of said recess, a resilient sealing ring bonded to the inner periphery of said reinforcing ring, said resilient sealing ring having a portion extending around the bottom of said outer reinforcing ring and said sealing ring being compressed between the bottom of said recess and the confronting surface of the other member; an inner rigid reinforcing ring bonded to the inner periphery of said resilient sealing ring in the region adjacent the inner end thereof, said inner end of said resilient sealing ring being grooved to increase the flexibility of said sealing ring.

6. In a valve structure, a valve body member having a fluid port therein; a closure member movably disposed in said body member for opening and closing said port, said members having confronting surfaces which are moved relatively when said closure member is moved, one of said surfaces having a recess therein surrounding said port when said closure member is in closed position, said recess having a cylindrical wall, a composite sealing ring received in said recess, said sealing ring comprising a rigid main reinforcing ring having concentric cylindrical surfaces, one of said cylindrical surfaces slidably engaging the cylindrical wall of said recess, a resilient sealing ring bonded to the other cylindrical surface of said main reinforcing ring, said resilient sealing ring having a portion extending around one end of said main reinforcing ring and being interposed between said one end of said main reinforcing ring and the bottom of said recess and said sealing ring being compressed between the bottom of said recess and the confronting surface of the other member, a secondary rigid reinforcing ring bonded to said resilient sealing ring in the region opposite said one end of said main reinforcing ring, said resilient sealing ring being grooved in the region adjacent the bottom of said recess to increase the flexibility of said sealing ring.

7. A plug valve comprising a body having inlet and outlet ports communicating with a chamber, a plug mounted for rotation in said chamber between an open position in which a through passage in said plug connects said inlet port to said outlet port and a closed position in which said passage is out of alignment with said ports, said body having recesses bounded by a continuous annular wall surrounding said ports, an annular composite sealing structure received in each of said recesses, each sealing structure comprising a resilient sealing ring compressed between the bottom of the recess and the surface of said plug surrounding said port when said valve is closed, an inner metal reinforcing ring bonded to the inner periphery of said resilient sealing ring, the inner periphery of said inner ring slidably engaging said annular wall, an outer rigid reinforcing ring bonded to the outer periphery of said resilient sealing ring in the region adjacent the bottom of said recess, said resilient sealing ring having a sealing portion engaging a surface of said plug radially outward of said inner reinforcing ring and having a second sealing portion engaging the bottom of said recess, the area encompassed by the seal at the bottom of said recess being smaller than the area encompassed by the seal against the plug surface whereby the entire composite sealing ring structure is urged outwardly against the wall of said plug by the application of fluid pressure, said resilient sealing ring being grooved in the region adjacent the bottom of said recess to increase the flexibility of said sealing ring.

8. In a gate valve, a valve body member having a fluid port therein; a gate member movably disposed in said body member for opening and closing said port, said members having confronting surfaces which are moved relatively when said gate member is moved, one of said surfaces having a recess therein surrounding said port when said gate member is in closed position, said recess having a cylindrical wall, a composite sealing ring received in said recess, said sealing ring comprising a rigid main reinforcing ring having concentric cylindrical surfaces, one of said cylindrical surfaces slidably engaging the cylindrical wall of said recess, a resilient sealing ring bonded to the other cylindrical surface of said main reinforcing ring, said resilient sealing ring having a portion extending around the end of said main reinforcing ring adjacent the bottom of said recess and said sealing ring being compressed between the bottom of said recess and the confronting surface of the other member, a secondary rigid reinforcing ring bonded to said resilient sealing ring in the region opposite said end of said main reinforcing ring, said resilient sealing ring being grooved in the region adjacent the bottom of said recess to increase the flexibility of said sealing ring.

References Cited by the Examiner

UNITED STATES PATENTS

| | | | |
|---|---|---|---|
| 2,151,442 | 3/39 | Roberts et al. | 251—172 |
| 2,433,732 | 12/47 | Brown | 251—309 |
| 2,844,353 | 7/58 | Curries | 251—175 |
| 2,970,805 | 2/61 | Pool | 251—175 |
| 3,067,977 | 12/62 | Anderson et al. | 251—172 |
| 3,096,786 | 7/63 | Rost | 251—172 |

FOREIGN PATENTS

| | | |
|---|---|---|
| 1,264,179 | 5/61 | France. |
| 803,448 | 10/58 | Great Britain. |

LAVERNE D. GEIGER, *Primary Examiner.*